US011921214B2

(12) United States Patent
Viswanatha et al.

(10) Patent No.: US 11,921,214 B2
(45) Date of Patent: Mar. 5, 2024

(54) TECHNIQUES FOR FOVEATED AND DYNAMIC RANGE MODES FOR FMCW LIDARS

(71) Applicant: Aeva, Inc., Mountain View, CA (US)

(72) Inventors: Kumar Bhargav Viswanatha, Santa Clara, CA (US); Jose Krause Perin, Mountain View, CA (US); Mina Rezk, Haymarket, VA (US); James Reuther, San Francisco, CA (US); James Nakamura, Chicago, IL (US); Kshitij Jain, Fremont, CA (US)

(73) Assignee: Aeva, Inc., Mountain View, CA (US)

( * ) Notice: Subject to any disclaimer, the term of this patent is extended or adjusted under 35 U.S.C. 154(b) by 0 days.

(21) Appl. No.: 18/162,563

(22) Filed: Jan. 31, 2023

(65) Prior Publication Data

US 2024/0045066 A1 Feb. 8, 2024

Related U.S. Application Data

(60) Provisional application No. 63/394,893, filed on Aug. 3, 2022.

(51) Int. Cl.
*G01S 17/89* (2020.01)
*G01S 17/931* (2020.01)

(52) U.S. Cl.
CPC ............ *G01S 17/89* (2013.01); *G01S 17/931* (2020.01)

(58) Field of Classification Search
None
See application file for complete search history.

(56) References Cited

U.S. PATENT DOCUMENTS

2014/0071121 A1* 3/2014 Russ .................... G06V 20/653 345/419
2018/0113200 A1* 4/2018 Steinberg ................ G01S 17/10

FOREIGN PATENT DOCUMENTS

WO WO-2021003440 A1 * 1/2021 .......... B60W 60/001

* cited by examiner

*Primary Examiner* — Isam A Alsomiri
*Assistant Examiner* — Sanjida Naser
(74) *Attorney, Agent, or Firm* — Womble Bond Dickinson (US) LLP

(57) ABSTRACT

A method transmits a first optical beam towards targets within a field of view (FOV). The first optical beam is modulated at a first chirp rate for a first set of scan lines that correspond to a first distance of the targets. The method identifies conditions based on the FOV to calculate a second chirp rate, and generates a scan pattern by transmitting a second optical beam towards the targets within the FOV. The second optical beam is modulated at the second chirp rate for a second set of scan lines that corresponds to a second distance of the one or more targets. The method generates, based on the first and second optical beams, the point cloud that includes multiple data points related to the target in which some of the data points are related to a first target and other data points are related to a second target.

17 Claims, 11 Drawing Sheets

500

| System Configuration | Chirp Slope | Resolution |
|---|---|---|
| Short Range Configuration | High Chirp Slope | High Resolution |
| Long Range Configuration | Low Chirp Slope | Low Resolution |

| | RANGE MODE | DESCRIPTION |
|---|---|---|
| 610 | Foveated Range Mode | Run different system configurations in different areas of the field of view (FOV) |
| 620 | Periodic Change Dynamic Range Mode | Periodically change system configurations in certain parts of FOV to identify targets beyond a certain range |
| 630 | Movement Dynamic Range Mode | Stationary Sensor: Short range configuration<br>Moving Sensor: Change to long range configuration as velocity increases |
| 640 | Environment Dynamic Range Mode | Indoor/parking lot/ Pedestrian environment: Short range configuration.<br>Medium/High Speed Driving: Long range configuration. |
| 650 | Mapping Dynamic Range Mode | Use mapping and localization information to determine the desired maximum detectable range configuration and select appropriate range configuration. |
| 660 | Pilot Line Scanning Dynamic Range Mode | Range estimation based on pilot lines scanning |
| 670 | Histogram Dynamic Range Mode | Range estimation based on range histograms |

Figure 6

TECHNIQUES FOR FOVEATED AND DYNAMIC RANGE MODES FOR FMCW LIDARS

CROSS-REFERENCE TO RELATED APPLICATIONS

This application claims priority from and the benefit of U.S. Provisional Patent Application No. 63/394,893 filed Aug. 3, 2022, the entire contents of which are incorporated herein by reference.

TECHNICAL FIELD

The present disclosure relates generally to frequency modulated continuous wave (FMCW) light detection and ranging (LIDAR) systems, and more particularly to systems and methods for foveated and dynamic range mode adjustments in FMCW LIDAR systems.

BACKGROUND

A LIDAR system includes an optical scanner to transmit a frequency-modulated continuous wave (FMCW) infrared (IR) optical beam and to receive a return signal from reflections of the optical beam; an optical processing system coupled with the optical scanner to generate a baseband signal in the time domain from the return signal, where the baseband signal includes frequencies corresponding to LIDAR target ranges; and a signal processing system coupled with the optical processing system to measure energy of the baseband signal in the frequency domain, to compare the energy to an estimate of LIDAR system noise, and to determine a likelihood that a signal peak in the frequency domain indicates a detected target.

SUMMARY

One aspect disclosed herein is directed to a method of modulating one or more optical beams in a frequency modulated continuous wave (FMCW) light detection and ranging (LIDAR) system. In some embodiments, the method includes transmitting a first optical beam towards targets within a field of view (FOV). The first optical beam is modulated at a first chirp rate for a first set of scan lines included in the FOV, and the first set of scan lines correspond to a first distance of the targets relative to the FMCW LIDAR system. In some embodiments, the method includes identifying conditions based on the FOV to calculate a second chirp rate and generating a scan pattern by transmitting a second optical beam towards the targets within the FOV. The second optical beam is modulated at the second chirp rate for a second set of scan lines included in the FOV, and the second set of scan lines correspond to a second distance of the targets relative to the FMCW LIDAR system. In some embodiments, the first distance is greater than the second distance and the first and second sets of scan lines are different. In some embodiments, the method includes generating, based on the first and second optical beams, the point cloud including multiple data points related to the targets. A first set of data points are related to a first target that is distinguished from a second set of data points related to a second target based on the first and second chirp rates.

According to some embodiments, the method includes scanning the scan pattern produced from the FOV. The scan pattern includes multiple scan lines and at least one pilot line; and modulating the second optical beam at the second chirp rate while scanning the pilot line.

According to some embodiments, the method includes generating a range histogram based on the first optical beam transmitted towards the targets within the FOV. According to some embodiments, the method includes analyzing the range histogram against a maximum instrumented range value corresponding to a first range configuration associated with the first chirp rate; and changing the first range configuration to a second range configuration based on the analyzing. The second range configuration corresponds to a different maximum instrumented range associated with the second chirp rate.

According to some embodiments, the method includes identifying a target at a target location responsive to analyzing the point cloud; modulating the first optical beam at the first chirp rate while scanning the target location; and modulating the second optical beam at the second chirp rate while scanning outside the target location. According to some embodiments, the method includes determining that the FMCW LIDAR system is stationary and modulating the first optical beam at the first chirp rate; and determining that the FMCW LIDAR system is in motion and modulating the second optical beam at the second chirp rate.

According to some embodiments, the method includes determining a location of the FMCW LIDAR system based on analyzing an environment external to the FMCW LIDAR system. Responsive to determining that the FMCW LIDAR system is positioned proximate to multiple objects exceeding a crowd threshold, the method includes modulating the first optical beam at the first chirp rate; and responsive to determining that the FMCW LIDAR system is not positioned proximate to the multiple objects exceeding the crowd threshold, the method modulates the second optical beam at the second chirp rate.

According to some embodiments, the method includes determining a location of the FMCW LIDAR system based on analyzing mapping data. Responsive to determining that the FMCW LIDAR system is located in a rural area, the method includes modulating the first optical beam at the first chirp rate. Responsive to determining that the FMCW LIDAR system is located in an urban area, the method includes modulating the second optical beam at the second chirp rate.

These and other features, aspects, and advantages of the present disclosure will be apparent from a reading of the following detailed description together with the accompanying figures, which are briefly described below. The present disclosure includes any combination of two, three, four or more features or elements set forth in this disclosure, regardless of whether such features or elements are expressly combined or otherwise recited in a specific example implementation described herein. This disclosure is intended to be read holistically such that any separable features or elements of the disclosure, in any of its aspects and example implementations, should be viewed as combinable unless the context of the disclosure clearly dictates otherwise.

It will therefore be appreciated that this Summary is provided merely for purposes of summarizing some example implementations so as to provide a basic understanding of some aspects of the disclosure. Accordingly, it will be appreciated that the above described example implementations are merely examples and should not be construed to narrow the scope or spirit of the disclosure in any way. Other example implementations, aspects, and advantages will become apparent from the following detailed description taken in conjunction with the accompanying figures which illustrate, by way of example, the principles of some described example implementations.

BRIEF DESCRIPTION OF THE FIGURE(S)

Embodiments and implementations of the present disclosure will be understood more fully from the detailed description given below and from the accompanying drawings of various aspects and implementations of the disclosure, which, however, should not be taken to limit the disclosure to the specific embodiments or implementations, but are for explanation and understanding only.

FIG. 5 shows a table illustrating system configuration tradeoffs in accordance with embodiments of the present disclosure;

FIG. 6 is table illustrating various approaches to changing range modes in real time;

Figure 10A:
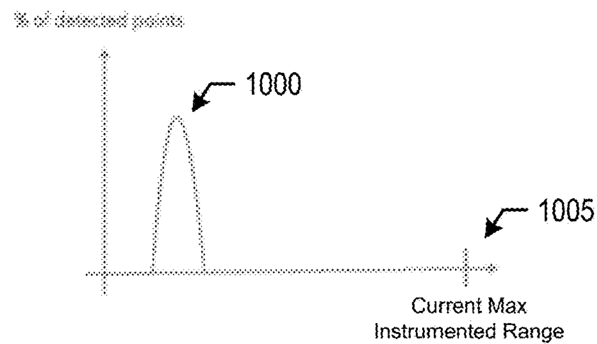
Figure 10B:
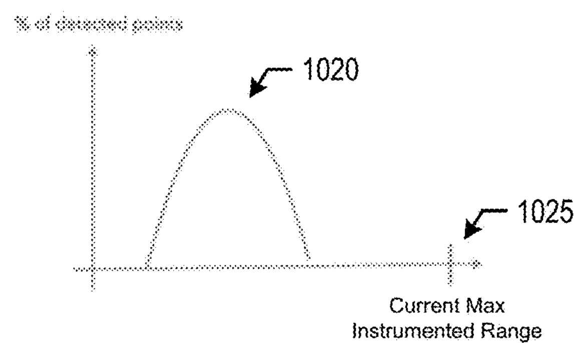
Figure 10C:
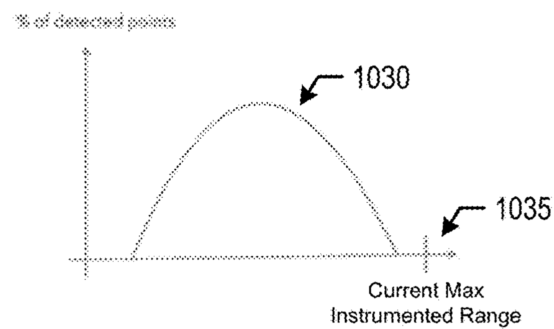
Figure 11:
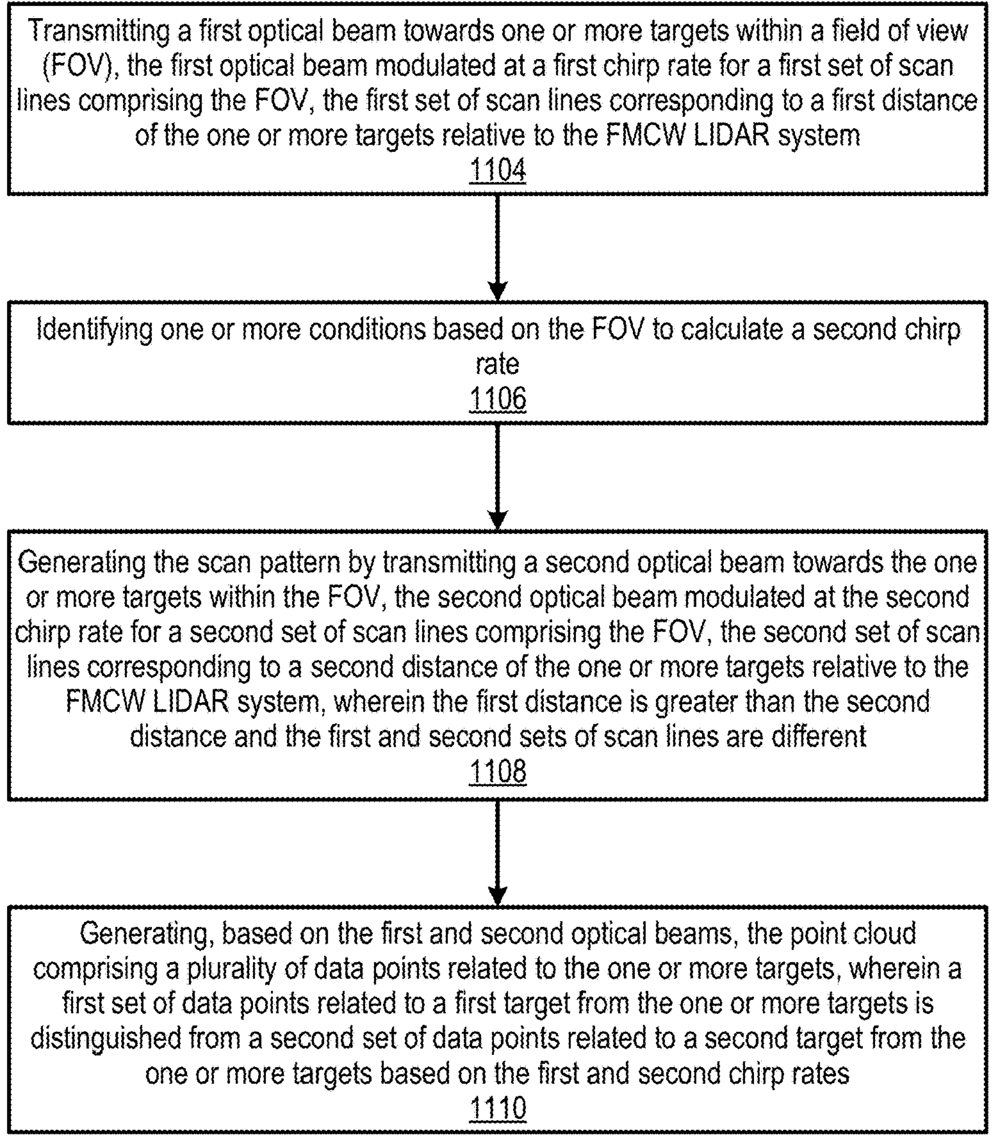

FIGS. 10A, 10B, and 10C are diagrams illustrating range configuration adjustments based on detected points histogram analysis; and FIG. 11 is a flow diagram illustrating an example method for adjusting range configurations in accordance with embodiments of the present disclosure.

DETAILED DESCRIPTION

According to some embodiments, the described LIDAR system described herein may be implemented in any sensing market, such as, but not limited to, transportation, manufacturing, metrology, medical, virtual reality, augmented reality, and security systems. According to some embodiments, the described LIDAR system is implemented as part of a front-end of frequency modulated continuous-wave (FMCW) device that assists with spatial awareness for automated driver assist systems, or self-driving vehicles.

Light from a frequency-swept, or "chirped", laser is split into two portions; one portion (Tx) is transmitted to the target while the second portion (LO) is kept local and does not travel to the target. The laser light returning from the target (Rx) is interferometrically recombined with the LO and detected. Because the Rx has traveled to the target and back, it is simply a time-delayed replica of the LO waveform. Fast-scanning mirrors are the primary components used to illuminate a scene in most conventional LIDAR systems. One mirror typically scans quickly along the X direction (azimuth), while another mirror scans slowly along the Y direction (elevation). Light emission and detection from target reflections are done coaxially, typically via a single-mode fiber. The collected light has a measured delay or an altered frequency signature that is used to extract range, and potentially velocity, information. A 3D point cloud for a field of view (FOV) can be established when the point-wise detected range information is combined with angular position feedback from the scanning mirrors.

FMCW LIDAR systems set system configurations (referred to herein as range configuration, short range configuration, and long range configurations), that correspond to max instrumented ranges. The range configuration will determine the slope of the chirp signal. For example, a short range configuration generates a high chirp slope signal and may provide a max range of 100 meters, whereas a long range configuration generates a low chirp slope signal and may provide a max range of 500 meters. As discussed herein, each of the range configurations have both advantages and disadvantages over the other range configurations. FMCW LIDAR systems, as discussed herein, may have multiple range configurations between the shortest range configuration and the longest range configuration.

Point cloud artifacts are most pronounced towards the edges of the FOV, especially when operating in a long range configuration. As such, operating the FOV borders in short range configuration mitigates artifacts significantly as the peaks are spaced further apart. The present disclosure addresses the above challenges by independently adjusting the range configurations, and effectively the chirp slopes, within multiple range of interest areas in the FOV based on various environmental conditions.

Figure 1:
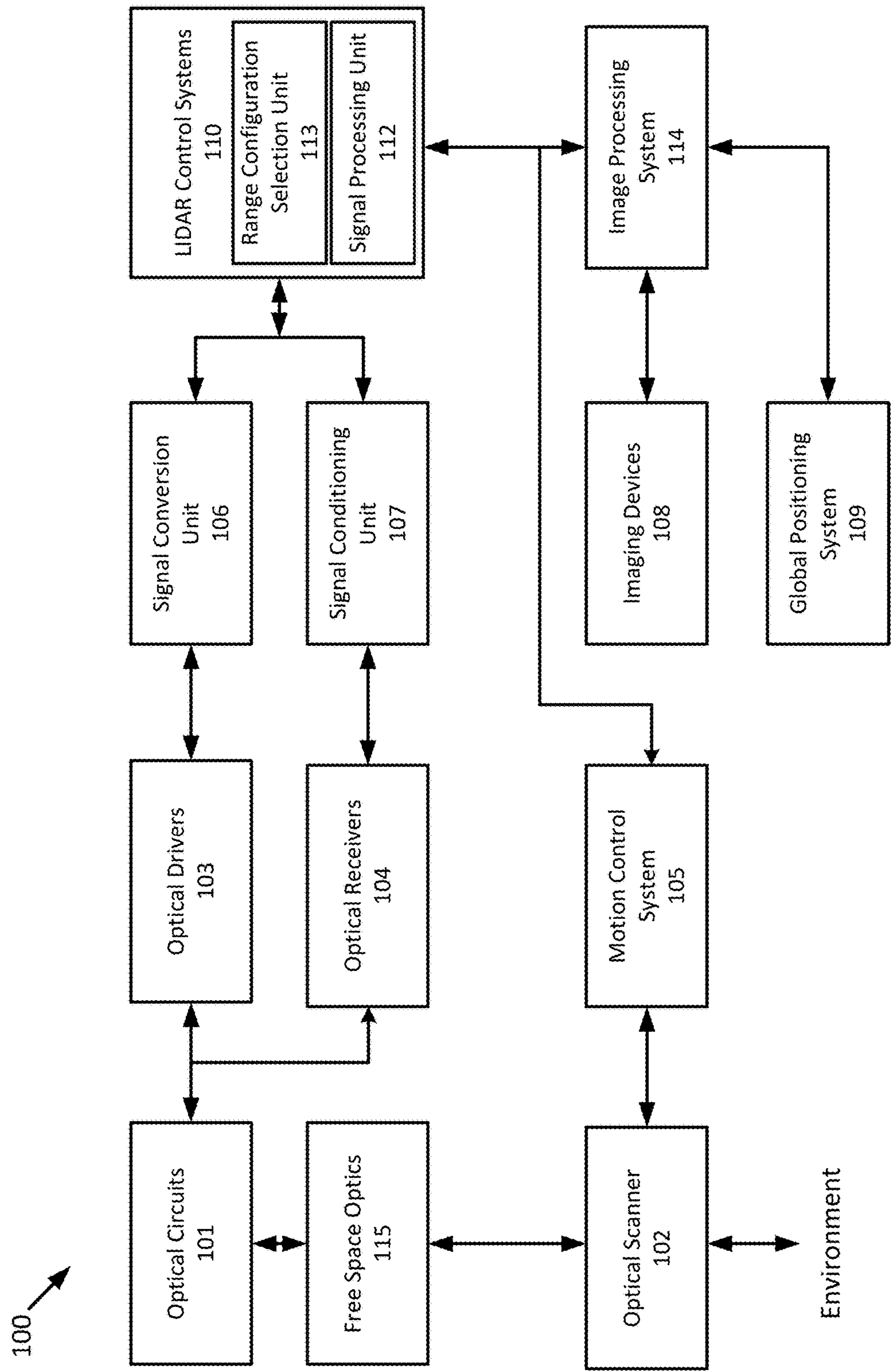
FIG. 1 is a block diagram illustrating an example of a LIDAR system, according to some embodiments.

FIG. 1 is a block diagram illustrating an example of a LIDAR system, according to some embodiments. The LIDAR system 100 includes one or more of each of a number of components, but may include fewer or additional components than shown in FIG. 1. One or more of the components depicted in FIG. 1 can be implemented on a photonics chip, according to some embodiments. The optical circuits 101 may include a combination of active optical components and passive optical components. Active optical components may generate, amplify, and/or detect optical signals and the like. In some embodiments, the active optical component includes optical beams at different wavelengths, and includes one or more optical amplifiers, one or more optical detectors, or the like. In some embodiments, one or more LIDAR systems 100 may be mounted onto any area (e.g., front, back, side, top, bottom, and/or underneath) of a vehicle to facilitate the detection of an object in any free-space relative to the vehicle. In some embodiments, the vehicle may include a steering system and a braking system, each of which may work in combination with one or more LIDAR systems 100 according to any information (e.g., one or more rigid transformations, distance/ranging information, Doppler information, etc.) acquired and/or available to the LIDAR system 100. In some embodiments, the vehicle may include a vehicle controller that includes the one or more components and/or processors of the LIDAR system 100.

Free space optics 115 may include one or more optical waveguides to carry optical signals, and route and manipulate optical signals to appropriate input/output ports of the active optical circuit. In embodiments, the one or more optical waveguides may include one or more graded index waveguides, as will be described in additional detail below at FIGS. 3-6. The free space optics 115 may also include one or more optical components such as taps, wavelength division multiplexers (WDM), splitters/combiners, polarization beam splitters (PBS), collimators, couplers or the like. In some embodiments, the free space optics 115 may include components to transform the polarization state and direct received polarized light to optical detectors using a PBS, for example. The free space optics 115 may further include a diffractive element to deflect optical beams having different frequencies at different angles along an axis (e.g., a fast-axis).

In some embodiments, the LIDAR system 100 includes an optical scanner 102 that includes one or more scanning mirrors that are rotatable along an axis (e.g., a slow-axis) that is orthogonal or substantially orthogonal to the fast-axis of the diffractive element to steer optical signals to scan an environment according to a scanning pattern. For instance, the scanning mirrors may be rotatable by one or more galvanometers. Objects in the target environment may scatter an incident light into a return optical beam or a target return signal. The optical scanner 102 also collects the return optical beam or the target return signal, which may be returned to the passive optical circuit component of the optical circuits 101. For example, the return optical beam may be directed to an optical detector by a polarization beam splitter. In addition to the mirrors and galvanometers, the optical scanner 102 may include components such as a quarter-wave plate, lens, anti-reflective coated window or the like.

To control and support the optical circuits 101 and optical scanner 102, the LIDAR system 100 includes LIDAR control systems 110. The LIDAR control systems 110 may include a processing device for the LIDAR system 100. In some embodiments, the processing device may be one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. The processing device may also be one or more special-purpose processing devices such as an application specific integrated circuit (ASIC), a field programmable gate array (FPGA), a digital signal processor (DSP), network processor, or the like.

In some embodiments, the LIDAR control system 110 may include a processing device that may be implemented with a DSP, such as signal processing unit 112. The LIDAR control systems 110 are configured to output digital control signals to control optical drivers 103. In some embodiments, the digital control signals may be converted to analog signals through signal conversion unit 106. For example, the signal conversion unit 106 may include a digital-to-analog converter. The optical drivers 103 may then provide drive signals to active optical components of optical circuits 101 to drive optical sources such as lasers and amplifiers. In some embodiments, several optical drivers 103 and signal conversion units 106 may be provided to drive multiple optical sources.

The LIDAR control systems 110 are also configured to output digital control signals for the optical scanner 102. A motion control system 105 may control the galvanometers of the optical scanner 102 based on control signals received from the LIDAR control systems 110. For example, a digital-to-analog converter may convert coordinate routing information from the LIDAR control systems 110 to signals interpretable by the galvanometers in the optical scanner 102. In some embodiments, a motion control system 105 may also return information to the LIDAR control systems 110 about the position or operation of components of the optical scanner 102. For example, an analog-to-digital converter may in turn convert information about the galvanometers' position to a signal interpretable by the LIDAR control systems 110.

The LIDAR control systems 110 are further configured to analyze incoming digital signals. In this regard, the LIDAR system 100 includes optical receivers 104 to measure one or more beams received by optical circuits 101. For example, a reference beam receiver may measure the amplitude of a reference beam from the active optical component, and an analog-to-digital converter converts signals from the reference receiver to signals interpretable by the LIDAR control systems 110. Target receivers measure the optical signal that carries information about the range and velocity of a target in the form of a beat frequency, modulated optical signal. The reflected beam may be mixed with a second signal from a local oscillator. The optical receivers 104 may include a high-speed analog-to-digital converter to convert signals from the target receiver to signals interpretable by the LIDAR control systems 110. In some embodiments, the signals from the optical receivers 104 may be subject to signal conditioning by signal conditioning unit 107 prior to receipt by the LIDAR control systems 110. For example, the signals from the optical receivers 104 may be provided to an operational amplifier for amplification of the received signals and the amplified signals may be provided to the LIDAR control systems 110.

In some applications, the LIDAR system 100 may additionally include one or more imaging devices 108 configured to capture images of the environment, a global positioning system 109 configured to provide a geographic location of the system, or other sensor inputs. The LIDAR system 100 may also include an image processing system 114. The image processing system 114 can be configured to receive the images and geographic location, and send the images and location or information related thereto to the LIDAR control systems 110 or other systems connected to the LIDAR system 100.

In operation according to some embodiments, the LIDAR system 100 is configured to use nondegenerate optical sources to simultaneously measure range and velocity across two dimensions. This capability allows for real-time, long range measurements of range, velocity, azimuth, and elevation of the surrounding environment.

In some embodiments, the scanning process begins with the optical drivers 103 and LIDAR control systems 110. The LIDAR control systems 110 instruct, e.g., via range mode selection unit 113 and/or signal processor unit 112, the optical drivers 103 to independently modulate one or more optical beams, and these modulated signals propagate through the optical circuits 101 to the free space optics 115. The free space optics 115 directs the light at the optical scanner 102 that scans a target environment over a preprogrammed pattern defined by the motion control system 105. The optical circuits 101 may also include a polarization wave plate (PWP) to transform the polarization of the light as it leaves the optical circuits 101. In some embodiments, the polarization wave plate may be a quarter-wave plate or a half-wave plate. A portion of the polarized light may also be reflected back to the optical circuits 101. For example, lensing or collimating systems used in LIDAR system 100 may have natural reflective properties or a reflective coating to reflect a portion of the light back to the optical circuits 101.

Optical signals reflected back from an environment pass through the optical circuits 101 to the optical receivers 104.

Because the polarization of the light has been transformed, it may be reflected by a polarization beam splitter along with the portion of polarized light that was reflected back to the optical circuits 101. In such scenarios, rather than returning to the same fiber or waveguide serving as an optical source, the reflected signals can be reflected to separate optical receivers 104. These signals interfere with one another and generate a combined signal. The combined signal can then be reflected to the optical receivers 104. Also, each beam signal that returns from the target environment may produce a time-shifted waveform. The temporal phase difference between the two waveforms generates a beat frequency measured on the optical receivers 104 (e.g., photodetectors).

The analog signals from the optical receivers 104 are converted to digital signals by the signal conditioning unit 107. These digital signals are then sent to the LIDAR control systems 110. A signal processing unit 112 may then receive the digital signals to further process and interpret them. In some embodiments, the signal processing unit 112 also receives position data from the motion control system 105 and galvanometers (not shown) as well as image data from the image processing system 114. The signal processing unit 112 can then generate 3D point cloud data (sometimes referred to as, "a LIDAR point cloud") that includes information about range and/or velocity points in the target environment as the optical scanner 102 scans additional points. In some embodiments, a LIDAR point cloud may correspond to any other type of ranging sensor that is capable of Doppler measurements, such as Radio Detection and Ranging (RADAR). The signal processing unit 112 can also overlay 3D point cloud data with image data to determine velocity and/or distance of objects in the surrounding area. The signal processing unit 112 also processes the satellite-based navigation location data to provide data related to a specific global location.

Figure 2:
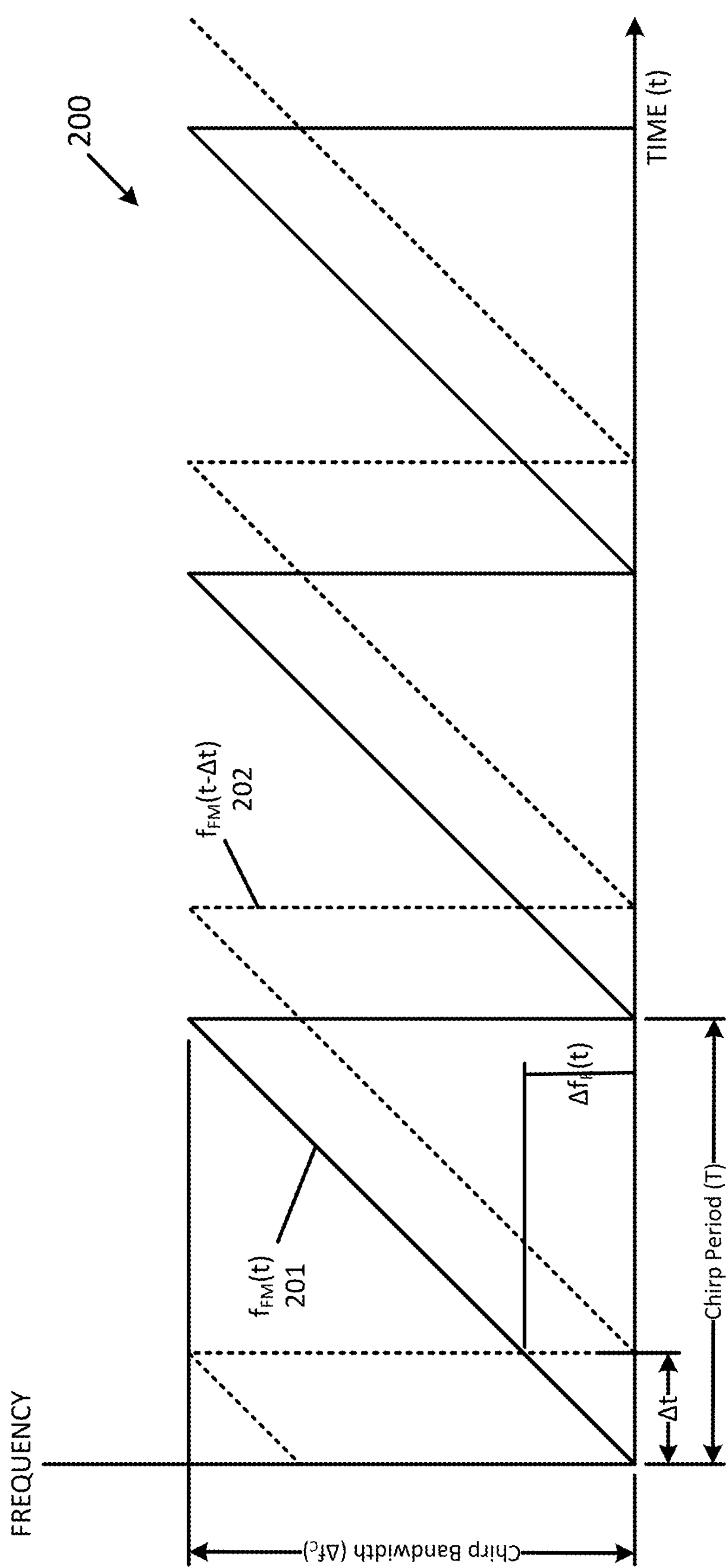
FIG. 2 is a time-frequency diagram illustrating an example of an FMCW scanning signal that can be used by a LIDAR system to scan a target environment, according to some embodiments.

FIG. 2 is a time-frequency diagram illustrating an example of an FMCW scanning signal that can be used by a LIDAR system to scan a target environment, according to some embodiments. In one example, the scanning waveform 201, labeled as $f_{FM}(t)$, is a sawtooth waveform (sawtooth "chirp") with a chirp bandwidth $\Delta f_C$ and a chirp period $T_C$. The slope of the sawtooth is given as $k=(\Delta f_C/T_C)$. FIG. 2 also depicts target return signal 202 according to some embodiments. Target return signal 202, labeled as $f_{FM}(t-\Delta t)$, is a time-delayed version of the scanning waveform 201, where $\Delta t$ is the round trip time to and from a target illuminated by scanning signal 201. The round trip time is given as $\Delta t=2R/v$, where R is the target range and v is the velocity of the optical beam, which is the speed of light c. The target range, R, can therefore be calculated as $R=c(\Delta t/2)$. When the return signal 202 is optically mixed with the scanning signal, a range-dependent difference frequency ("beat frequency") $\Delta f_R(t)$ is generated. The beat frequency $\Delta f_R(t)$ is linearly related to the time delay $\Delta t$ by the slope of the sawtooth k. That is, $\Delta f_R(t)=k\Delta t$. Since the target range R is proportional to $\Delta t$, the target range R can be calculated as $R=(c/2)(\Delta f_R(t)/k)$. That is, the range R is linearly related to the beat frequency $\Delta f_R(t)$. The beat frequency $\Delta f_R(t)$ can be generated, for example, as an analog signal in optical receivers 104 of system 100. The beat frequency can then be digitized by an analog-to-digital converter (ADC), for example, in a signal conditioning unit such as signal conditioning unit 107 in LIDAR system 100. The digitized beat frequency signal can then be digitally processed, for example, in a signal processing unit, such as signal processing unit 112 in system 100. It should be noted that the target return signal 202 will, in general, also includes a frequency offset (Doppler shift) if the target has a velocity relative to the LIDAR system 100. The Doppler shift can be determined separately, and used to correct (e.g., adjust, modify) the frequency of the return signal, so the Doppler shift is not shown in FIG. 2 for simplicity and ease of explanation. For example, LIDAR system 100 may correct the frequency of the return signal by removing (e.g., subtracting, filtering) the Doppler shift from the frequency of the returned signal to generate a corrected return signal. The LIDAR system 100 may then use the corrected return signal to calculate a distance and/or range between the LIDAR system 100 and the object. In some embodiments, the Doppler frequency shift of target return signal 202 that is associated with an object may be indicative of a velocity and/or movement direction of the object relative to the LIDAR system 100.

It should also be noted that the sampling frequency of the ADC will determine the highest beat frequency that can be processed by the system without aliasing. In general, the highest frequency that can be processed is one-half of the sampling frequency (i.e., the "Nyquist limit"). In one example, and without limitation, if the sampling frequency of the ADC is 1 gigahertz, then the highest beat frequency that can be processed without aliasing ($\Delta f_{Rmax}$) is 500 megahertz. This limit in turn determines the maximum range of the system as $R_{max}=(c/2)(\Delta f_{Rmax}/k)$ which can be adjusted by changing the chirp slope k. In one example, while the data samples from the ADC may be continuous, the subsequent digital processing described below may be partitioned into "time segments" that can be associated with some periodicity in the LIDAR system 100. In one example, and without limitation, a time segment might correspond to a predetermined number of chirp periods T, or a number of full rotations in azimuth by the optical scanner.

Figure 3:
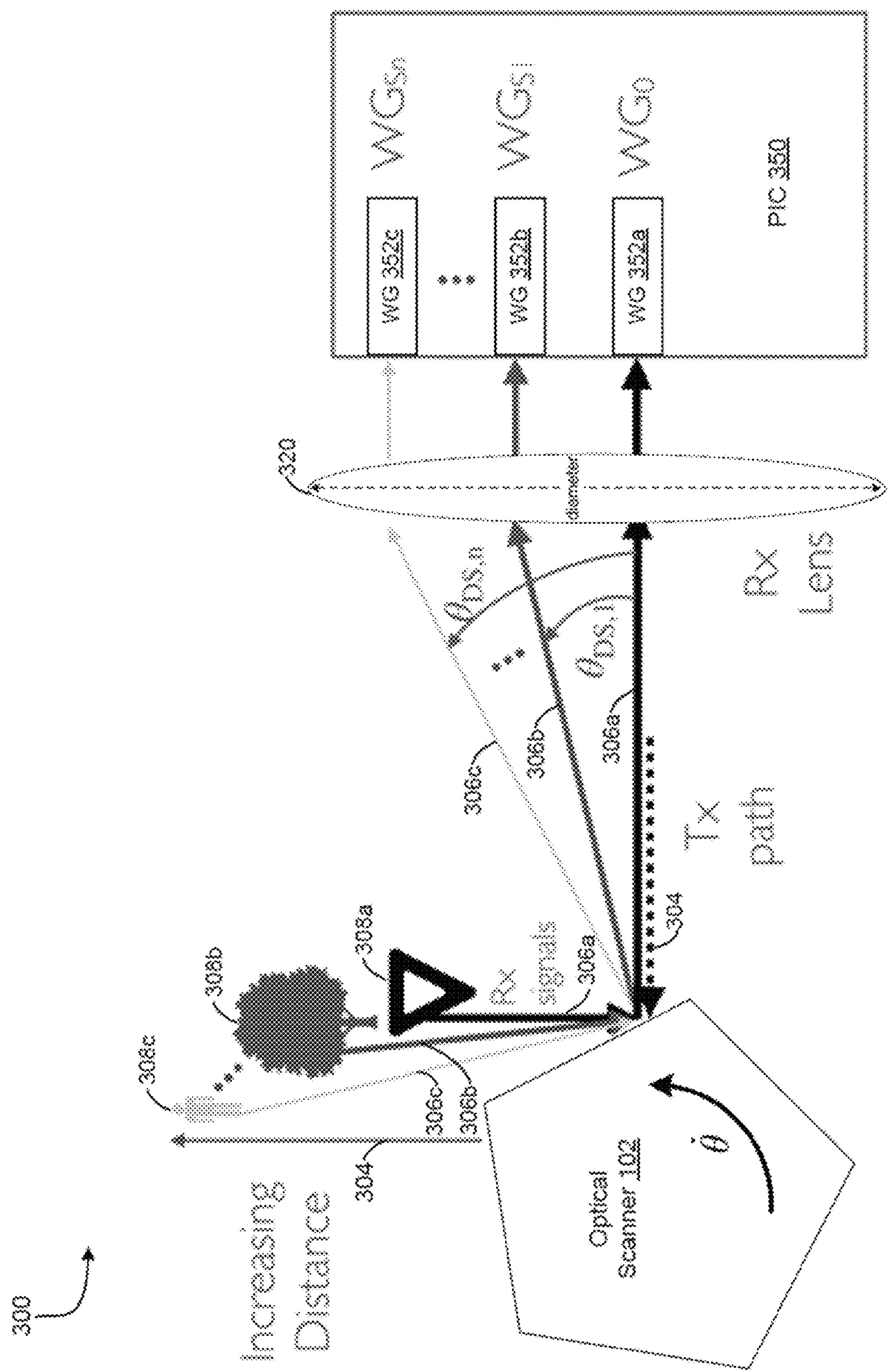
FIG. 3 is a block diagram illustrating an example environment for using array waveguide receivers (AWRs) in a LIDAR system to enhance detection of distant objects, according to some embodiments.

FIG. 3 is a block diagram illustrating an example environment for using array waveguide receivers (AWRs) in the LIDAR system 100 in FIG. 1 to enhance detection of distant objects, according to some embodiments. The environment 300 includes the optical scanner 102 (e.g., a prism, a mirror), a lens (sometimes referred to as, "optical element"), and an AWR that is fabricated on a photonic integrated circuit (PIC) 350. In some embodiments, any of the components (e.g., lens 320, PIC 350 with AWRs, etc.) in the environment 300 may be added as a component of the LIDAR system 100 in FIG. 1, or be used to replace or modify any of the one or more components (e.g., free space optics 115, optical circuits, optical receivers 104, etc.) of the LIDAR system 100.

The environment 300 includes one or more objects, such as object **308*a* (e.g., a street sign), object 308*b* (e.g., a tree), and object 308*c* (e.g., a pedestrian); each collectively referred to as objects 308. Although FIG. 3 shows only a select number of objects 308, the environment 300 may include any number of objects 308 of any type (e.g., pedestrians, vehicles, street signs, raindrops, snow, street surface) that are within a short distance (e.g., 30 meters) or a long distance (e.g., 300 meters, 500 meters and beyond) from the optical scanner 102. In some embodiments, an object 308 may be stationary or moving with respect to the optical scanner 102**.

In some embodiments, the optical scanner 102 is configured to receive one or more optical beams 304 from an optical beam source (not shown in FIG. 3). In some embodiments, the optical scanner 102 is configured to redirect (e.g., steer, transmit, scatter) the one or more optical beams 304 into free space toward the one or more objects 308, which causes the one or more optical beams to scatter into returned optical beams **306*a*, 306*b*, 306*c* (collectively referred to as, "returned optical beams 306"). For example, the one or more optical beams 304 scatter against the object 308***a* to create a returned optical beam 306*a*, which is returned to the LIDAR system 100. As another example, the one or more optical beams 304 scatter against the object 308*b* to create a returned optical beam 306*b*, which is returned to the LIDAR system 100. As another example, the one or more optical beams 304 scatter against the object 308*c* to create a returned optical beam 306*c*, which is returned to the LIDAR system 100.

The environment 300 includes a lens 320 (sometimes referred to as, "an optical element") for collecting (e.g., receiving, acquiring, aggregating) the returned optical beams 306 that scatter from the one or more objects 308 in response to the optical scanner 102 redirecting the one or more optical beams 304 into free space. In some embodiments, the lens 320 may be a symmetric lens having a diameter. In some embodiments, the lens 320 may be an asymmetric lens.

As shown in FIG. 3, the lag angle between a respective returned optical beam 306 and the lens 320 is indicated by $\theta_{DS,n}$, where n is an integer. For example, the lag angle between the returned optical beam 306*a* and the lens 320 is indicated by $\theta_{DS,0}$ (not shown in FIG. 3), the lag angle between the returned optical beam 306*b* and the lens 320 is indicated by $\theta_{DS,1}$, and the lag angle between the returned optical beam 306*c* and the lens 320 is indicated by $\theta_{DS,2}$ (shown in FIG. 3 as, $\theta_{DS,n}$). In some embodiments, increasing the scan rate of the optical scanner 102 produces a larger lag angle between one or more of the returned optical beams 306.

As shown in FIG. 3, the PIC 350 includes a set (e.g., one or more) of waveguides. The set of waveguides may include a primary on-axis waveguide (shown in FIG. 3 as, $WG_0$) and off-axis satellite waveguides (shown in FIG. 3 as, $WG_{S,n}$), which are positioned at a location in the PIC 350, for example, as expressed by the following Equation:

$$x_n = n \cdot p_{WGs} \tag{1}$$

where: n is the waveguide number; and $p_{WGs}$ is the designed pitch. In some embodiments, other than being positioned at unique locations in the PIC 350, a primary waveguide and a satellite waveguide may be the same type of waveguide.

As shown in FIG. 3, PIC 350 includes waveguide (WG) 352*a* that is configured as the primary on-axis waveguide for receiving the return optical beam 306*a* via the lens 320 responsive to the optical scanner 102 transmitting the one or more optical beams 304 into free space. The PIC 350 (sometimes referred to as, "an optical receiver") includes waveguide (WG) 352*b* that is configured as an off-axis satellite waveguide for receiving the return optical beam 306*b* via the lens 320 responsive to the optical scanner 102 transmitting the one or more optical beams 304 into free space. The PIC 350 includes waveguide (WG) 352*c* that is configured as an off-axis satellite waveguide for receiving the return optical beam 306*c* via the lens 320 responsive to the optical scanner 102 transmitting the one or more optical beams 304 into free space.

Thus, a satellite waveguide may be configured (e.g., positioned, arranged, constructed) to serve as an additional Rx channel to collect a returned optical beam 306 (e.g., scattered light) that is received at a particular lag angle, for example, as expressed in the following Equation:

$$\theta_{DS} = 2R/c \cdot \dot{\theta} \tag{2}$$

where: R is the target distance, c is the speed of light, and $\dot{\theta}$ is the azimuthal scan rate. In other words, one or more satellite waveguides may be positioned throughout the PIC 350 to allow a LIDAR system (e.g., LIDAR system 100) to receive returned optical beams 306 at increasing (e.g., large) values of lag angle.

In some embodiments, the returned optical beams 306 may have large lag angles that would otherwise be lost from the primary on-axis waveguide ($WG_0$) channel due to the finite size of the diameter of the lens 320 and/or the focal spot and de-scanned position of the returned optical beams 306, for example, as expressed in the following Equation:

$$x_{DS} = \theta_{DS} \cdot f_{Rx} \tag{3}$$

where $f_{Rx}$ is the focal length of the lens 320.

Although not shown in FIG. 3, the PIC 350 couples to the LIDAR control system 110 in FIG. 1 such to be able to pass any of the optical beams that are received by any of the WGs 352 to the LIDAR control system 110 for processing by the signal processing unit 112.

Figure 4:
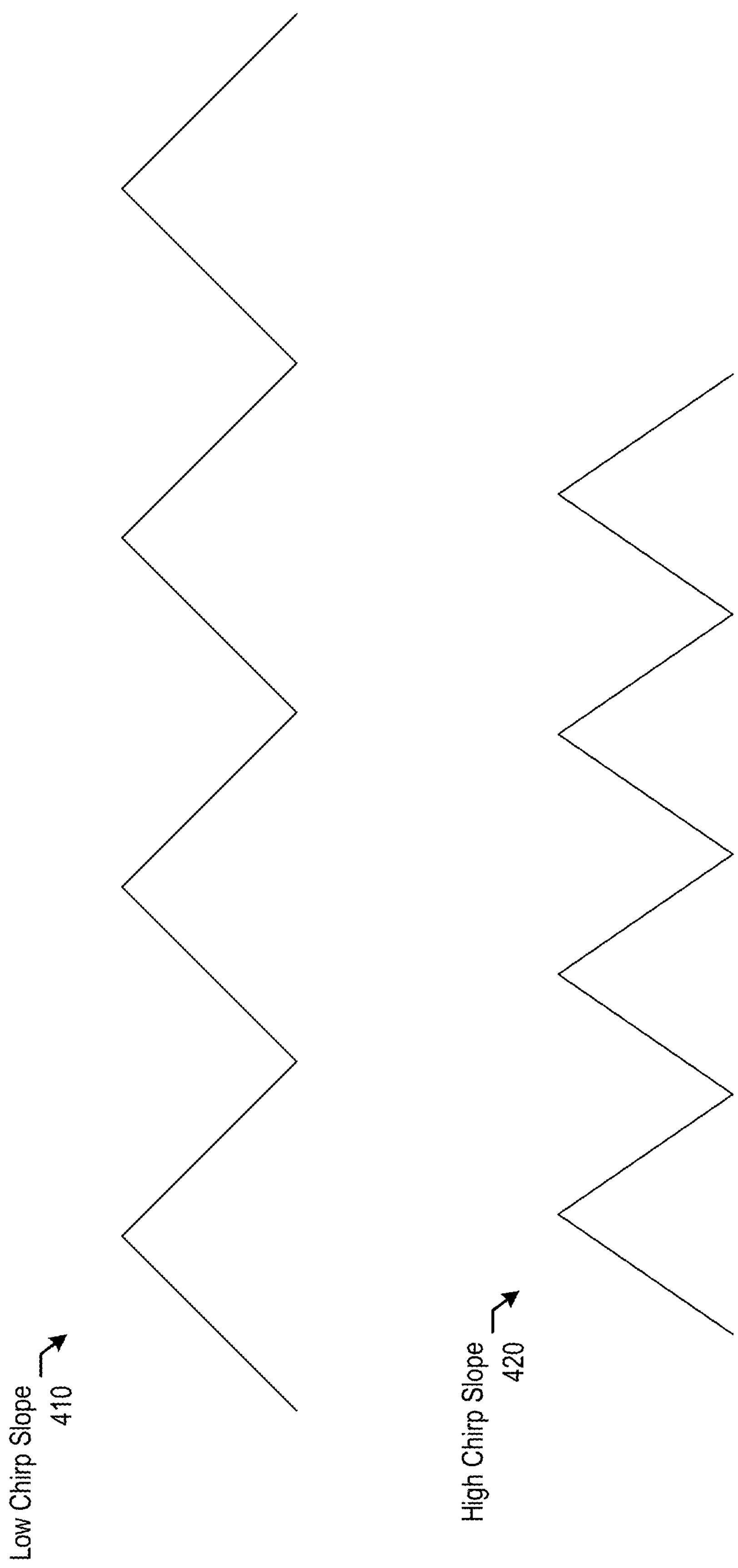
FIG. 4 is a diagram illustrating triangle modulations with different chirp slopes corresponding to different range modes in accordance with embodiments of the present disclosure.

FIG. 4 is a diagram illustrating triangle modulations with different chirp slopes corresponding to different range configurations in accordance with embodiments of the present disclosure. Laser frequency is ramped up (increasing frequency), then ramped down (decreasing frequency) over time by optical drivers 103, with the ramp up and ramp down repeating in a series over time. The ramp rate of the chirp, i.e., the slope of the ramp or the rate of frequency change of the laser light, whether up or down, is phase locked to the reference frequency. Because there is a doppler shift from a target, there is an up chirp and a down chirp to measure both range and velocity.

The slope of the chirp, referred to herein as a chirp slope, provides advantages and disadvantages. Low chirp slope 410 has a decreased slope compared with high chirp slope 420. Low chirp slope 410 allows LIDAR system 100 to "see" farther away but produces increased artifacts in the point cloud. High chirp slope 420 allows LIDAR system 100 to see in higher resolution due to decreased artifacts but the maximum range decreases (see FIG. 5 and corresponding text for further details. By continuously adjusting the range configurations, which leads to continuously adjusting the chirp slope, LIDAR system 100 optimizes the point cloud data and ultimately improves point cloud analysis.

FIG. 5 shows a table illustrating system configuration tradeoffs in accordance with embodiments of the present disclosure. Although table 500 shows in column 510 a short range system configuration (short range configuration) and a long range system configuration (long range configuration), LIDAR system 100 may implement more system configurations such as several medium range system configurations, between the short range configuration and long range configuration. Table 500 shows in columns 520 and 530 that the short range configuration (e.g., 100 meter range) generates a high chirp slope with high resolution (low artifacts) and the long range configuration (e.g., 500 meter range) generates a low chirp slope with low resolution (high artifacts). In general, the higher the max range configuration selection, the lower the chirp slope, and the higher the range error (range noise).

FIG. 6 is table illustrating various approaches to changing system configurations in real time. Table 600 includes foveated range mode embodiments and dynamic range mode embodiments. Foveated range modes (row 610) pertain to embodiments where the range configurations vary according to one or more fixation points, or "range of interests" (ROIs). Foveated range modes allow LIDAR control systems 110 run different range configurations in different ROIs within a field of view. In turn, LIDAR control systems 110 sends instructions to optical drivers 103 to generate the corresponding chirp slopes and modulate the optical beams using the chirp slopes when the modulated optical beams are transmitted to the corresponding ROIs within the FOV (see FIGS. 7A, 7B, 8, and corresponding text for further details).

The dynamic range mode embodiments, shown in rows 620, 630, and 640, pertain to dynamically configuring the range configurations in any part of the FOV from one scan to the next scan based on several factors. Row 620 describes a periodic range mode where LIDAR control systems 110 periodically expands/shrinks the range configurations in certain parts of the FOV to identify targets beyond a certain range. For example, LIDAR control systems 110 may wish to view a target in the upper left hand corner of the FOV at a higher resolution. In this example, LIDAR control systems 110 dynamically changes the range configuration to a shorter range configuration at the upper left hand corner while keeping the rest of the FOV at a longer range configuration.

Row 630 describes three different dynamic range modes based on scenarios. The first dynamic range mode scenario is based on whether LIDAR system 100 is in motion. When LIDAR system 100 is stationary, LIDAR control systems 110 selects the short range configuration. When LIDAR system 100 begins moving, LIDAR control systems 110 increases the range configuration as velocity increases.

The second dynamic range mode scenario (row 640) is based on the surroundings and velocity. In indoor, parking lot, or pedestrian surroundings, LIDAR control systems 110 selects the short range configuration. During medium and high speed driving, LIDAR control systems 110 selects the longer range configuration. The third dynamic range mode scenario (row 650) uses mapping information to determine the appropriate range configuration. For example, LIDAR control systems 100 may use mapping information to determine a change in environment (speed, pedestrian area, parking lot, etc.), and proactively switch range configurations to prepare for the upcoming change in environment.

Rows 660 and 670 describes embodiments pertaining to maximum detectable range estimation. Row 650 shows a pilot line scanning dynamic range mode embodiment and adds pilot lines in the scan frame to scan at max distance. In this embodiment, LIDAR control systems 110 switches to a long range configuration during the pilot lines and determines whether targets exist outside the current range configuration. For example, LIDAR control systems 110 may be in a short range configuration; switch to a long range configuration during the pilot line scan; and determine that a target exists outside the short range configuration (see FIG. 9B and corresponding text for further details).

Row 670 shows a histogram dynamic range mode embodiment and adjusts the range configuration based on detected points histogram analysis. In this embodiment, LIDAR control systems 110 generates a histogram of detected points and, based on the distance of the detected points relative to the current max range configuration, LIDAR control systems 110 increases, maintains, or decrease the range configuration accordingly (see FIGS. 10A, 10B, and 10C and corresponding text for further details).

Figure 7A:
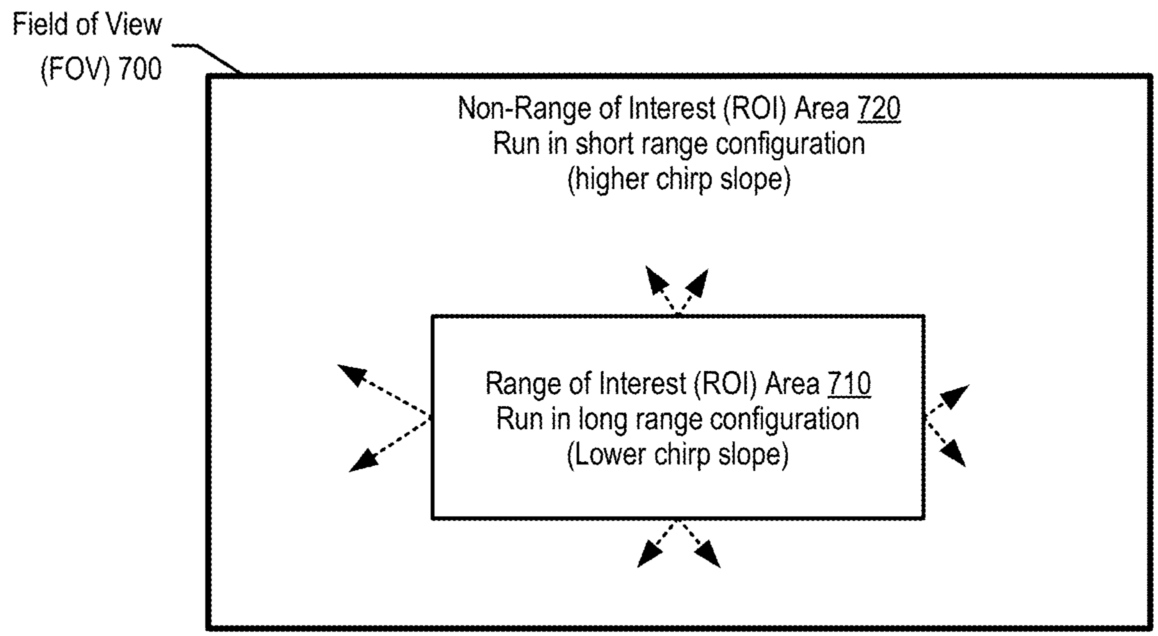
FIGS. 7A and 7B are diagrams illustrating range of interest areas within a field of view.
Figure 7B:
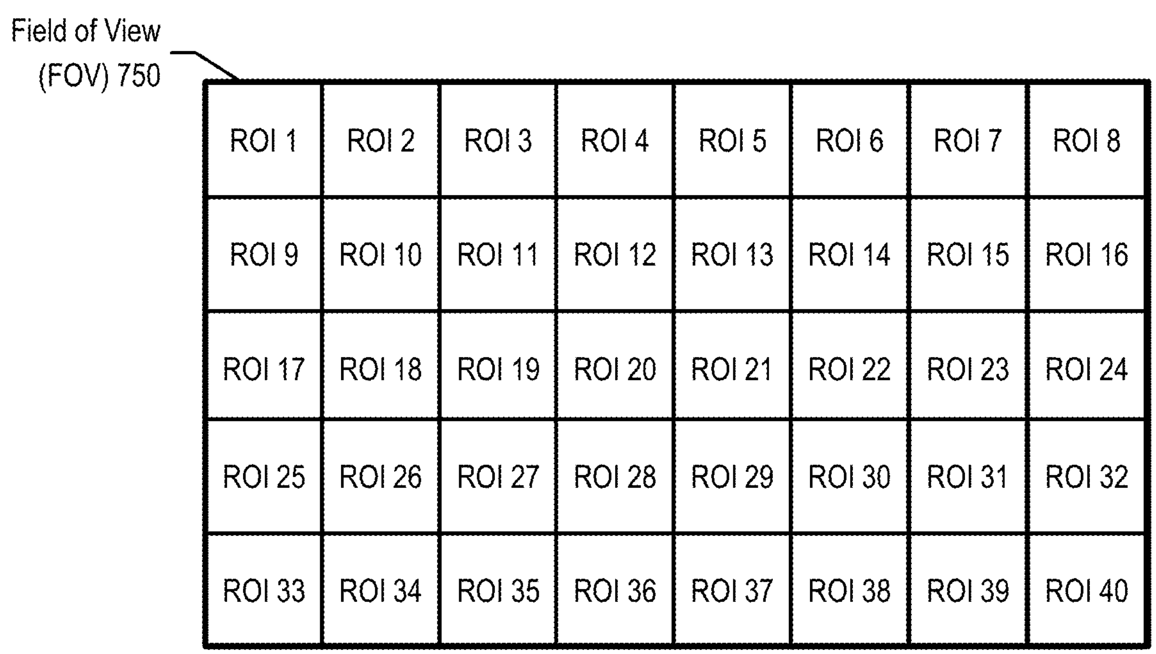

FIGS. 7A and 7B are diagrams illustrating range of interest areas within a field of view. FIG. 7A shows FOV 700 and includes range of interest area 710 and non-range of interest area 720. Range of interest area 710 runs in long range configuration (monitoring upcoming road conditions) and non-range of interest area 720 runs in short range configuration (to minimize artifacts in the point cloud). A key enabler that allows LIDAR control systems 110 to quickly switch range configurations is that optical drivers 103 have the ability to quickly switch chirp slopes.

In one embodiment, LIDAR control systems 110 moves ROI area 710 to different parts of the FOV 700 based on detected targets/interests in the environment. For example, if a vehicle comes to an intersection and the car curves to the right, LIDAR control systems 110 may move the range of interest towards the right side of the field of view. In one embodiment, where LIDAR control systems 110 transmits multiple optical beams, each one of the optical beams may be modulated based a different range configuration (different chirp slopes).

In one embodiment, the range configuration (chirp-slope) can be varied continuously across FOV 700 instead of discrete range configurations. In one embodiment, discrete range configurations are chosen for implementation complexity reasons.

Advantages of a foveated range mode are that in many applications, LIDAR control systems 100 does not need to detect a max instrumented range in the entire FOV 700. In parts of FOV 700, LIDAR control systems 110 limits the max instrumented range (limit range configuration) to achieve the optimum range precision for that required max range. In one embodiment, point cloud artifacts are more pronounced towards the edges of the FOV. Running those parts of the FOV in a shorter range configuration mitigates artifacts significantly as the peaks are spaced further apart. Key artifacts improved by this approach are i) gaps due to points overlapping with DC noise; ii) range-velocity ambiguity due to negative frequency peak detection; and iii) range-velocity ambiguity due to multi-peak detection. In one embodiment, the approach decreases optical amplifier power requirements outside the ROI by throttling the optical power outside the ROI.

FIG. 7B shows FOV 750 segmented into multiple ROIs. In this embodiment, LIDAR control systems 110 works with optical drivers 103 to apply range configurations independently to each of the ROIs. In one embodiment, a row of ROIs will have the same range configuration. In another embodiment, one or more adjacent ROIs will have the same range configuration.

Figure 8:
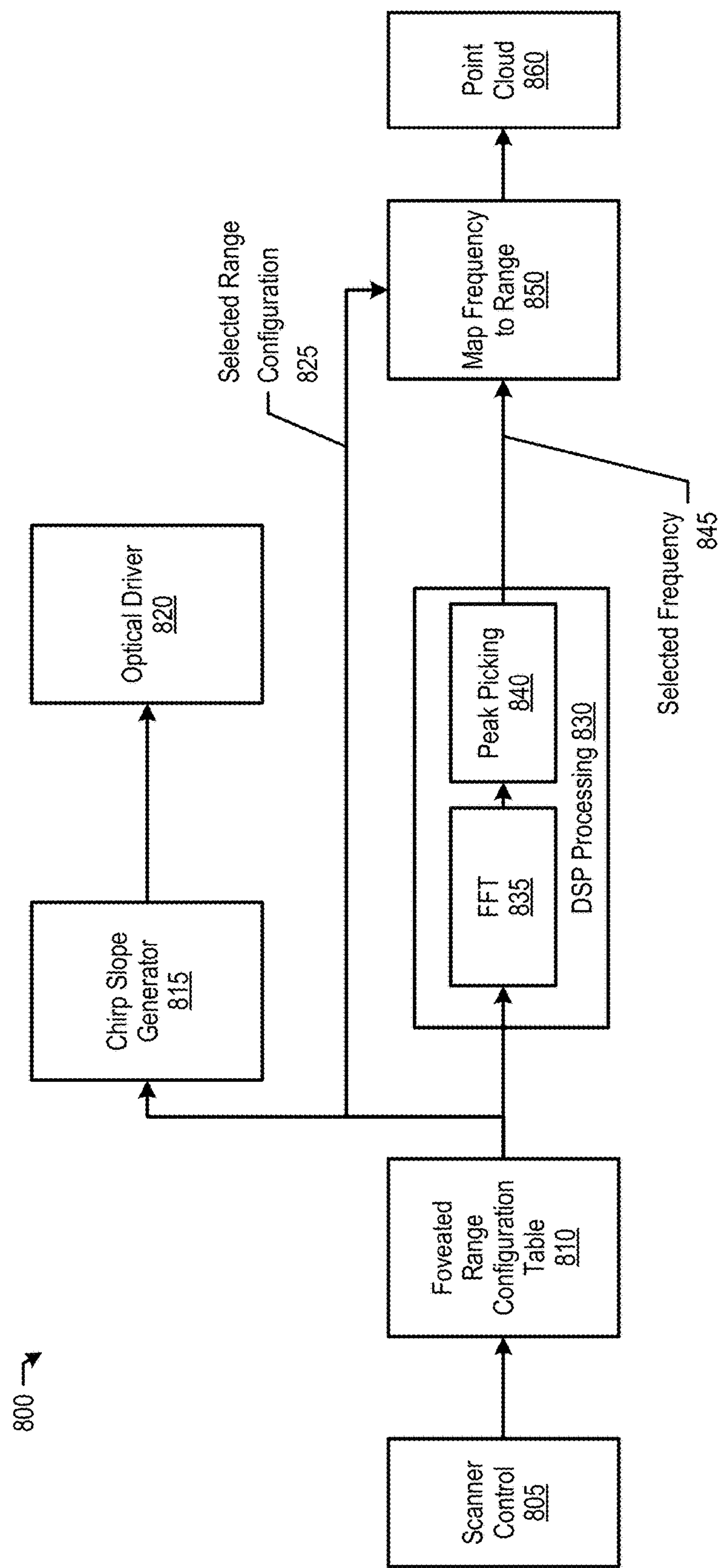
FIG. 8 is a block diagram illustrating components to change range configurations and chirp rates according to various embodiments of the disclosure.

FIG. 8 is a block diagram illustrating components to change range configurations and chirp rates according to various embodiments of the disclosure. Scanner control 805, such as LIDAR control systems 110 components, feed range configuration information into foveated range configuration table 810. In one embodiment, scanner control 805 stores, for example, reference frequencies of various chunks (ROI areas) corresponding to the FOV. In one embodiment, a higher reference frequency indicates a higher chirp slope.

Table 810 feeds into chirp slope generator 815, which feeds the selected chirp slope to optical driver 820. Table 810 also feeds into DSP processing 830, where DSP processing 830 uses FFT 835 and peak picking 840 to generate a selected frequency 845. Map frequency to range 850 then converts the selected frequency 845 to a range and feeds the range (e.g., in meters) to point cloud 860.

Figure 9A:
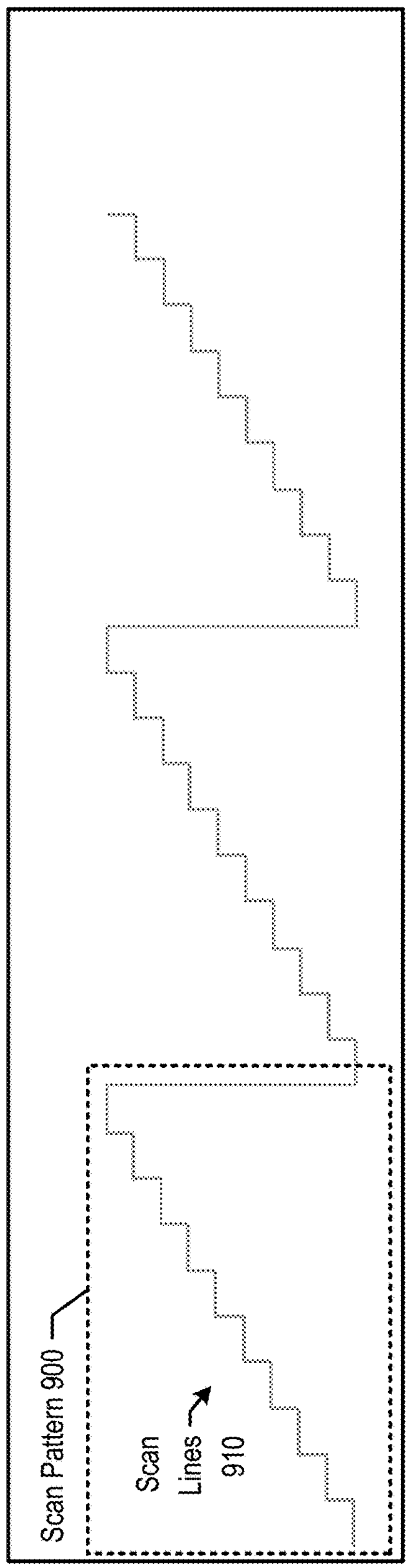
FIGS. 9A and 9B are diagrams illustrating a typical scan pattern and a scan pattern with inserted pilot lines.
Figure 9B:
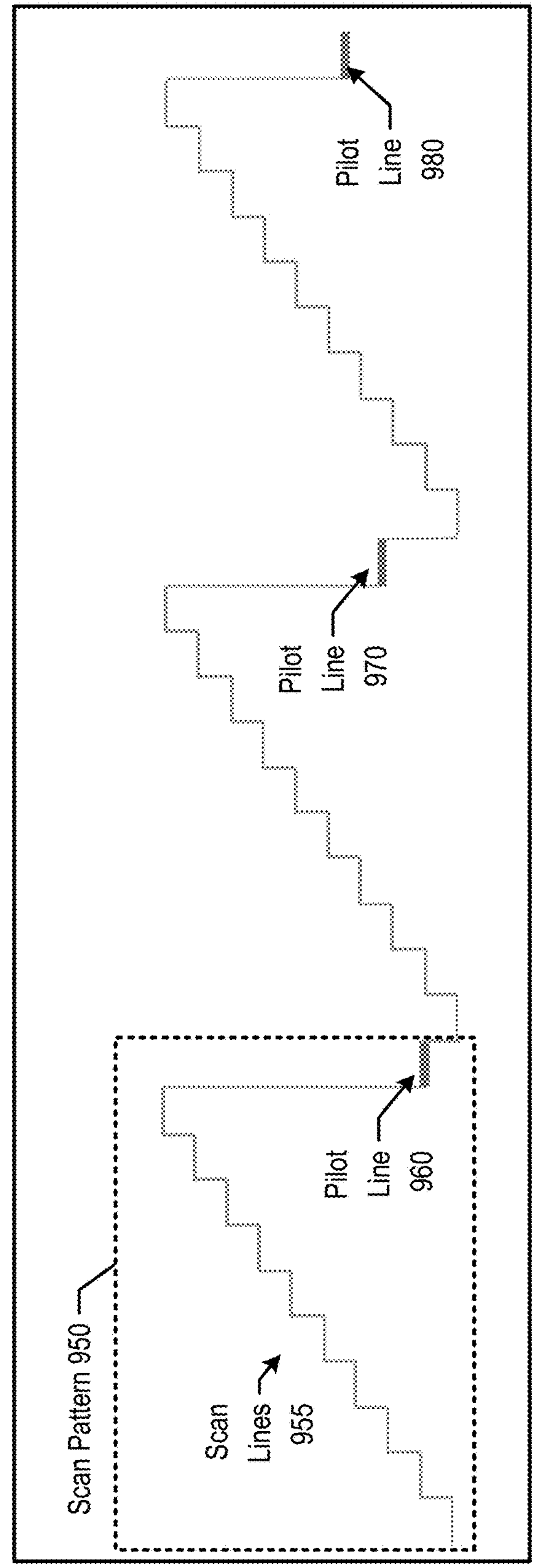

FIGS. 9A and 9B are diagrams illustrating a typical scan pattern and a scan pattern with inserted pilot lines. Referring to FIG. 9A, scan pattern 900 shows a typical scan pattern that performs azimuth scans at incremental vertical distances up the FOV via scan lines 910. Referring to FIG. 9B, scan pattern 950 shows that a pilot line is added into each vertical scan (e.g., scan lines 955), which are pilot lines 960, 970, and 980. In one embodiment, information from the pilot line scans is not sent out of the system, but instead LIDAR control systems 110 switches to long range configuration to (e.g., 500 m) to see if targets are beyond the current range configuration (e.g., 200 m). Over time, the pilot line information is accumulated and LIDAR control systems 110 determines whether to switch range configurations, either for the entire FOV or for a portion of the FOV.

FIGS. 10A, 10B, and 10C are diagrams illustrating range configuration adjustments based on detected points histogram analysis. At any given time, LIDAR control systems 110 is operating at a "current" range configuration. While in the current range configuration, LIDAR control systems 110 generates a histogram 1000 of detected target points in the point cloud. FIG. 10A shows that the histogram 1000 indicates that the detected target points are not close to the maximum instrumented range of the current range configuration. As such, LIDAR control systems 110 switches to a shorter range configuration.

FIG. 10B shows another example when, while in the current range configuration, LIDAR control systems 110 generates a histogram 1020 of detected target points in the point cloud. Histogram 1020 indicates that the detected target points are mid-range of the maximum instrumented rage of the current range configuration. As such, LIDAR control systems 110 maintains the current range configuration.

FIG. 10C shows another example when, while in the current range configuration, LIDAR control systems 110 generates a histogram 1030 of detected target points in the point cloud. Histogram 1030 indicates that the detected target points are in the upper area of the maximum instrumented range of the current range configuration. As such, LIDAR control systems 110 switches to a longer range configuration.

In one embodiment LIDAR control systems 110 implements an algorithm and changes range configurations based on the following criteria:

If the 95th percentile of the range of points detected is less than threshold 1, then switch to a lower range configuration up to the smallest range configuration;

else if the 95th percentile of the range of points detected is less than threshold 2, then keep same range configuration;

else switch to a higher range configuration.

In one embodiment, LIDAR control systems 110 adds additional conditions such as switching to a max range configuration if the number of points detected in the entire FOV is less than threshold 3.

In one embodiment, LIDAR control systems 110 divides the entire FOV into many small chunks and computes the histogram/number of points in each chunk and selects the range configuration individually per FOV chunk, similar to FOV 750 shown in FIG. 7B. In some embodiments, LIDAR control systems 110 concurrently utilizes dynamic range modes and foveated range modes with various range of interests.

FIG. 11 is a flow diagram illustrating an example method for adjusting range configurations in accordance with embodiments of the present disclosure. In some embodiments, the method 1100 may include the operation 1104 of transmitting a first optical beam towards one or more targets within a field of view (FOV), the first optical beam modulated at a first chirp rate for a first set of scan lines comprising the FOV, the first set of scan lines corresponding to a first distance of the one or more targets relative to the FMCW LIDAR system. In some embodiments, the method 1100 may include the operation 1106 of identifying, using a processor, one or more conditions based on the FOV to calculate a second chirp rate.

In some embodiments, the method 1100 may include the operation 1108 of generating the scan pattern by transmitting a second optical beam towards the one or more targets within the FOV, the second optical beam modulated at the second chirp rate for a second set of scan lines comprising the FOV, the second set of scan lines corresponding to a second distance of the one or more targets relative to the FMCW LIDAR system, wherein the first distance is greater than the second distance and the first and second sets of scan lines are different. In some embodiments, the method 1100 may include the operation 1110 of generating, based on the first and second optical beams, the point cloud comprising a plurality of data points related to the one or more targets, wherein a first set of data points related to a first target from the one or more targets is distinguished from a second set of data points related to a second target from the one or more targets based on the first and second chirp rates.

The preceding description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. While this specification contains many specific implementation details, these should not be construed as limitations on the scope of any embodiment of the present disclosure or of what may be claimed, but rather as descriptions of features specific to particular embodiments of particular embodiments. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination. Moreover, the separation of various system components in the embodiments described above should not be understood as requiring such separation in all embodiments, and it should be understood that the described program components and systems can generally be integrated together in a single software product or packaged into multiple software products. Particular embodiments may vary from these exemplary details and still be contemplated to be within the scope of the present disclosure.

Reference throughout this specification to "one embodiment" or "an embodiment" means that a particular feature, structure, or characteristic described in connection with the embodiments included in at least one embodiment. Thus, the appearances of the phrase "in one embodiment" or "in an embodiment" in various places throughout this specification are not necessarily all referring to the same embodiment. In addition, the term "or" is intended to mean an inclusive "or" rather than an exclusive "or."

Although the operations of the methods herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be in an intermittent or alternating manner.

The above description of illustrated implementations of the disclosure, including what is described in the Abstract, is not intended to be exhaustive or to limit the disclosure to the precise forms disclosed. While specific implementations of, and examples for, the disclosure are described herein for illustrative purposes, various equivalent modifications are possible within the scope of the disclosure, as those skilled in the relevant art will recognize. The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

What is claimed is:

1. A method of generating a point cloud based on a scan pattern for a frequency-modulated continuous wave (FMCW) light detection and ranging (LIDAR) system, the method comprising:

transmitting a first optical beam towards one or more targets within a field of view (FOV), the first optical beam modulated at a first chirp rate for a first set of scan lines comprising the FOV, the first set of scan lines corresponding to a first distance of the one or more targets relative to the FMCW LIDAR system;

identifying, using a processor, one or more conditions based on the FOV to calculate a second chirp rate, wherein the identifying the one or more conditions further comprises scanning a pilot line in the scan pattern using a second optical beam modulated at the second chirp rate;

generating the scan pattern by transmitting the second optical beam towards the one or more targets within the FOV, the second optical beam modulated at the second chirp rate for a second set of scan lines comprising the FOV, the second set of scan lines corresponding to a second distance of the one or more targets relative to the FMCW LIDAR system, wherein the first distance is greater than the second distance and the first and second sets of scan lines are different; and generating, based on the first and second optical beams, the point cloud comprising a plurality of data points related to the one or more targets, wherein a first set of data points related to a first target from the one or more targets is distinguished from a second set of data points related to a second target from the one or more targets based on the first and second chirp rates.

2. The method of claim 1, wherein identifying one or more conditions further comprises:

generating a range histogram based on the first optical beam transmitted towards the one or more targets within the FOV;

analyzing the range histogram against a maximum instrumented range value corresponding to a first range configuration associated with the first chirp rate; and changing the first range configuration to a second range configuration based on the analyzing, wherein the second range configuration corresponds to a different maximum instrumented range associated with the second chirp rate.

3. The method of claim 1, further comprising:

identifying a target at a target location responsive to analyzing the point cloud;

modulating the first optical beam at the first chirp rate while scanning the target location; and modulating the second optical beam at the second chirp rate while scanning outside the target location.

4. The method of claim 1, wherein identifying one or more conditions further comprises:

responsive to determining that the FMCW LIDAR system is stationary, modulating the first optical beam at the first chirp rate; and responsive to determining that the FMCW LIDAR system is in motion, modulating the second optical beam at the second chirp rate.

5. The method of claim 1, wherein identifying one or more conditions further comprises:

determining a location of the FMCW LIDAR system based on analyzing an environment external to the FMCW LIDAR system;

responsive to determining that the FMCW LIDAR system is positioned proximate to a plurality of objects exceeding a crowd threshold, modulating the first optical beam at the first chirp rate; and responsive to determining that the FMCW LIDAR system is not positioned proximate to the plurality of objects exceeding the crowd threshold, modulating the second optical beam at the second chirp rate.

6. The method of claim 1, further comprising:

determining a location of the FMCW LIDAR system based on analyzing mapping data;

responsive to determining that the FMCW LIDAR system is located in a rural area, modulating the first optical beam at the first chirp rate; and responsive to determining that the FMCW LIDAR system is located in an urban area, modulating the second optical beam at the second chirp rate.

7. A frequency-modulated continuous wave (FMCW) light detection and ranging (LIDAR) system, the system comprising:

an optical source to:

transmit a first optical beam towards one or more targets within a field of view (FOV), the first optical beam modulated at a first chirp rate for a first set of scan lines comprising the FOV, the first set of scan lines corresponding to a first distance of the one or more targets relative to the FMCW LIDAR system; and transmit a second optical beam towards the one or more targets within the FOV, the second optical beam modulated at a second chirp rate for a second set of scan lines comprising the FOV, the second set of scan lines corresponding to a second distance of the one or more targets relative to the FMCW LIDAR system, wherein the first distance is greater than the second distance and the first and second sets of scan lines are different;

a processor; and a memory to store instructions that, when executed by the processor, cause the system to:

identify one or more conditions based on the FOV to calculate the second chirp rate, wherein the identifying the one or more conditions further comprises scanning a pilot line in a scan pattern using the second optical beam modulated at the second chirp rate; and generate, based on the first and second optical beams, a point cloud comprising a plurality of data points related to the one or more targets, wherein a first set of data points related to a first target from the one or more targets is distinguished from a second set of data points related to a second target from the one or more targets based on the first and second chirp rates.

8. The FMCW LIDAR system of claim 7, wherein the instructions, when executed by the processor, cause the system to:

generate a range histogram based on the first optical beam transmitted towards the one or more targets within the FOV;

analyze the range histogram against a maximum instrumented range value corresponding to a first range configuration associated with the first chirp rate; and change the first range configuration to a second range configuration based on the analyzing, wherein the second range configuration corresponds to a different maximum instrumented range associated with the second chirp rate.

9. The FMCW LIDAR system of claim 7, wherein the instructions, when executed by the processor, cause the system to:

identify a target at a target location responsive to analyzing the point cloud;

modulate the first optical beam at the first chirp rate while scanning the target location; and modulate the second optical beam at the second chirp rate while scanning outside the target location.

10. The FMCW LIDAR system of claim 7, wherein the instructions, when executed by the processor, cause the system to:

responsive to determine that the FMCW LIDAR system is stationary, modulate the first optical beam at the first chirp rate; and responsive to determine that the FMCW LIDAR system is in motion, modulate the second optical beam at the second chirp rate.

11. The FMCW LIDAR system of claim 7, wherein the instructions, when executed by the processor, cause the system to:

determine a location of the FMCW LIDAR system based on analyzing an environment external to the FMCW LIDAR system;

responsive to determine that the FMCW LIDAR system is positioned proximate to a plurality of objects that exceeds a crowd threshold, modulate the first optical beam at the first chirp rate; and responsive to determine that the FMCW LIDAR system is not positioned proximate to the plurality of objects that exceeds the crowd threshold, modulate the second optical beam at the second chirp rate.

12. The FMCW LIDAR system of claim 7, wherein the instructions, when executed by the processor, cause the system to:

determine a location of the FMCW LIDAR system based on analyzing mapping data;

responsive to determine that the FMCW LIDAR system is located in a rural area, modulate the first optical beam at the first chirp rate; and responsive to determine that the FMCW LIDAR system is located in an urban area, modulate the second optical beam at the second chirp rate.

13. A non-transitory computer-readable storage medium including instructions that, when executed by a processor, cause the processor to:

transmit a first optical beam towards one or more targets within a field of view (FOV), the first optical beam modulated at a first chirp rate for a first set of scan lines comprising the FOV, the first set of scan lines corresponding to a first distance of the one or more targets relative to the FMCW LIDAR system; and transmit a second optical beam towards the one or more targets within the FOV, the second optical beam modulated at a second chirp rate for a second set of scan lines comprising the FOV, the second set of scan lines corresponding to a second distance of the one or more targets relative to the FMCW LIDAR system, wherein the first distance is greater than the second distance and the first and second sets of scan lines are different;

identify one or more conditions based on the FOV to calculate the second chirp rate, wherein the identifying the one or more conditions further comprises scanning a pilot line in a scan pattern using the second optical beam modulated at the second chirp rate; and generate, based on the first and second optical beams, a point cloud comprising a plurality of data points related to the one or more targets, wherein a first set of data points related to a first target from the one or more targets is distinguished from a second set of data points related to a second target from the one or more targets based on the first and second chirp rates.

14. The non-transitory computer-readable storage medium of claim 13, wherein the instructions further cause the processor to:

generate a range histogram based on the first optical beam transmitted towards the one or more targets within the FOV;

analyze the range histogram against a maximum instrumented range value corresponding to a first range configuration associated with the first chirp rate; and change the first range configuration to a second range configuration based on the analyzing, wherein the second range configuration corresponds to a different maximum instrumented range associated with the second chirp rate.

15. The non-transitory computer-readable storage medium of claim 13, wherein the instructions further cause the processor to:

identify a target at a target location responsive to analyzing the point cloud;

modulate the first optical beam at the first chirp rate while scanning the target location; and modulate the second optical beam at the second chirp rate while scanning outside the target location.

16. The non-transitory computer-readable storage medium of claim 13, wherein the instructions further cause the processor to:

responsive to determine that the FMCW LIDAR system is stationary, modulate the first optical beam at the first chirp rate; and responsive to determine that the FMCW LIDAR system is in motion, modulate the second optical beam at the second chirp rate.

17. The non-transitory computer-readable storage medium of claim 13, wherein the instructions further cause the processor to:

determine a location of the FMCW LIDAR system based on analyzing an environment external to the FMCW LIDAR system;

responsive to determine that the FMCW LIDAR system is positioned proximate to a plurality of objects that exceeds a crowd threshold, modulate the first optical beam at the first chirp rate; and responsive to determine that the FMCW LIDAR system is not positioned proximate to the plurality of objects that exceeds the crowd threshold, modulate the second optical beam at the second chirp rate.

* * * * *